(12) United States Patent
Wickland et al.

(10) Patent No.: US 6,413,304 B1
(45) Date of Patent: Jul. 2, 2002

(54) DRUM VENT FILTER

(75) Inventors: Terry J. Wickland, Evergreen; Michael D. Peterson, Parker, both of CO (US)

(73) Assignee: Nuclear Filter Technology, Inc., Golden, CO (US)

( * ) Notice: Subject to any disclaimer, the term of this patent is extended or adjusted under 35 U.S.C. 154(b) by 33 days.

(21) Appl. No.: 09/658,373

(22) Filed: Sep. 8, 2000

(51) Int. Cl.$^7$ .................................................. B01D 53/04

(52) U.S. Cl. .............................. 96/147; 96/135; 96/153; 55/523

(58) Field of Search ........................... 96/108, 134, 135, 96/147, 148, 153, 154; 55/356, 357, 523

(56) References Cited

U.S. PATENT DOCUMENTS

| | | | | |
|---|---|---|---|---|
| 4,518,704 A | * | 5/1985 | Okabayashi et al. | 96/153 X |
| 4,689,057 A | * | 8/1987 | Gasper | 96/147 X |
| 5,478,377 A | * | 12/1995 | Scavnicky et al. | 96/154 X |
| 6,217,639 B1 | * | 4/2001 | Jackson | 96/134 |

* cited by examiner

*Primary Examiner*—Robert H. Spitzer
(74) *Attorney, Agent, or Firm*—Millen, White, Zelano & Branigan, P.C.

(57) ABSTRACT

A drum vent filter useful for venting hydrogen gas from transuranic wastes in order to remove particles from the gas while controlling the release of VOCs has a carbon-to-carbon filter media of increased density with a relatively large filter face and reduced thickness. In addition, a protective lid is provided over the filter element which has been substantially increased so as to enhance the diffusion of hydrogen gas through the filter element.

10 Claims, 3 Drawing Sheets

DRUM VENT FILTER

FIELD OF THE INVENTION

The present invention is directed to an improved drum vent filter. More particularly, the present invention is directed to an improved vent filter which has improved hydrogen gas permeability.

BACKGROUND OF THE INVENTION

Disposing of toxic waste, especially transuranic waste, presents modern societies with a daunting challenge. The waste is produced at one site, such as an industrial site or power generation site and must be eventually transported to a waste disposal or a waste storage site. Transporting these materials is hazardous because the materials are transported by trucks over existing highway systems. Frequently these materials generate gases which are also hazardous. The gases may result in combustion which can disperse the waste before the waste reaches the waste disposal or waste storage site. It has been determined that hydrogen gas is generated by radioactive waste. Accordingly, the Department of Transportation has set limits on the amount of hydrogen gas in a container of radioactive waste which may be safely shipped even if the container is vented. The rate of venting is therefore an important consideration because it is desirable to vent as much gas from the container as possible before the container is shipped and while the container is awaiting permanent storage. After the drum has been filled with waste such as transuranic waste, it is important that the gas being vented is filtered so as to remove particulate matter which may be radioactive and also to impede the diffusion of volatile organic compounds (VOCs) out of the drums.

In view of these considerations, there is a need to improve the drum vent filters currently used.

SUMMARY OF THE INVENTION

In view of the aforementioned considerations, the present invention is directed to an improved drum vent filter for filtering hydrogen gas to remove particles therefrom. The drum vent filter comprises an annular housing having an axially extending portion with a threaded exterior surface and a cylindrical interior surface defining a cylindrical interior space with first and second axial openings. The cylindrical interior surface has an annular lip therein having an axially facing support surface and a free surface. The free surface is spaced a selected distance from the first axial opening and the support surface is spaced a selected difference from the second axial opening. A radial flange extends outwardly from the outwardly extending portion of the housing and has a top surface which is flush with the second opening of the cylindrical interior surface and a bottom surface adjacent the threaded exterior surface of the cylindrical portion. A cylindrical filter element comprised of a carbon-to-carbon filter media is disposed within the cylindrical space and has a bottom surface abutting the annular lip and a top surface flush with the top surface of the radial flange. The filter element is retained within the cylindrical space with a peripheral layer of adhesive sealant. Disposed in spaced relation to the top surface of the radial flange is a lid which defines an axial gap between the top surfaces of the filter element and radial flange and a radial gap between the top surface of the radial flange and the bottom surface of the lid. An annular seal is disposed about the cylindrical portion of the housing and abuts the bottom surface of the radial flange wherein the axial gap between the bottom surface of the lid has a height in the range of about 0.125 inch to about 0.175 inch, and preferably about 0.150 inch; wherein the cylindrical space has a diameter of at least 0.8 inch and wherein the housing has an axial length no greater than about 0.375 inch, whereby diffusion of hydrogen gas through the vent is enhanced.

In a further aspect of the invention, the carbon-to-carbon filter media has a thickness in the range of one quarter to three-tenths inch, a density of 0.2 to 0.3 g/cm$^3$ and a diameter in the range of 0.60 inch to 1 inch and preferably about 0.70 inch.

In a further aspect of the invention, the housing has overall height in the range of 0.65 inch to 0.85 inch, and preferably about 0.75 inch and is made of type 304 stainless steel.

DETAILED DESCRIPTION

Figure 1:
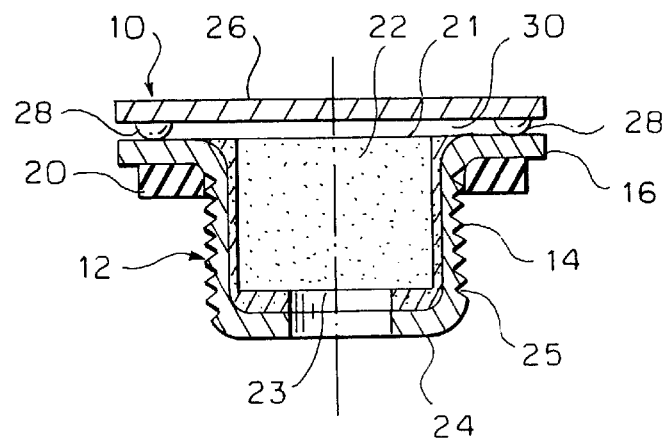
FIG. 1 is a side elevation of a prior art drum vent filter over which the drum vent filter of the present invention is an improvement.
Figure 2:
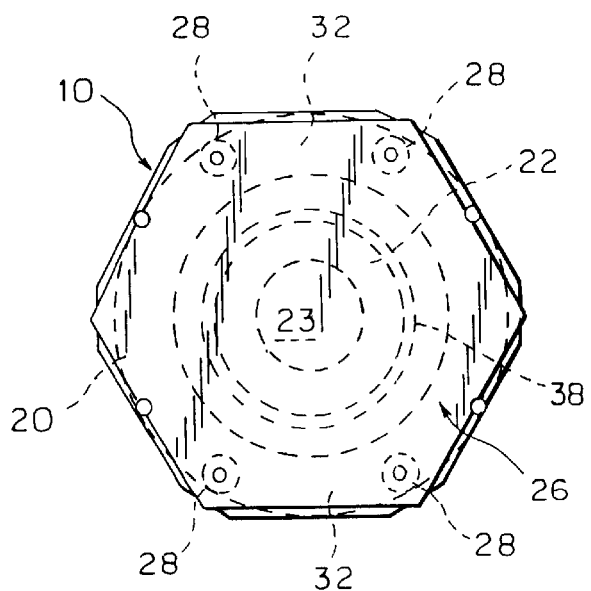
FIG. 2 is a top view of the prior art drum vent filter of FIG. 1.
Figure 3:
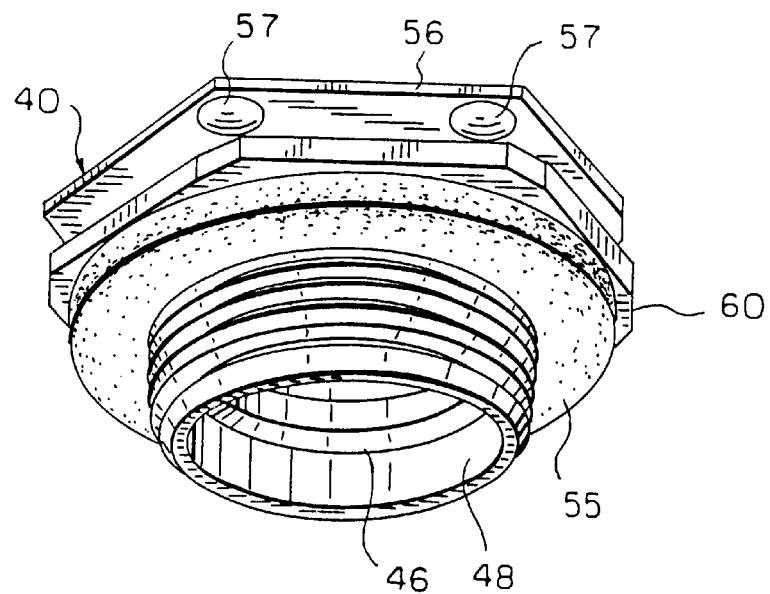
FIG. 3 is a side perspective view of a drum vent filter configured in accordance with the principles of the present invention.
Figure 4:
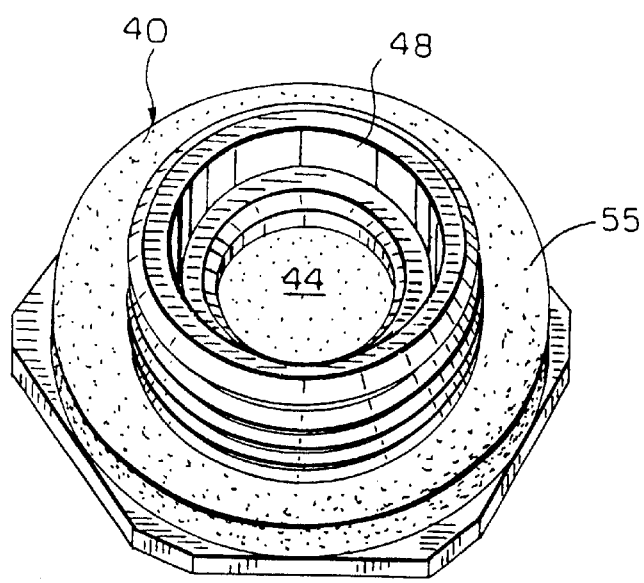
FIG. 4 is a bottom perspective view of the drum vent filter of FIG. 3.
Figure 5:
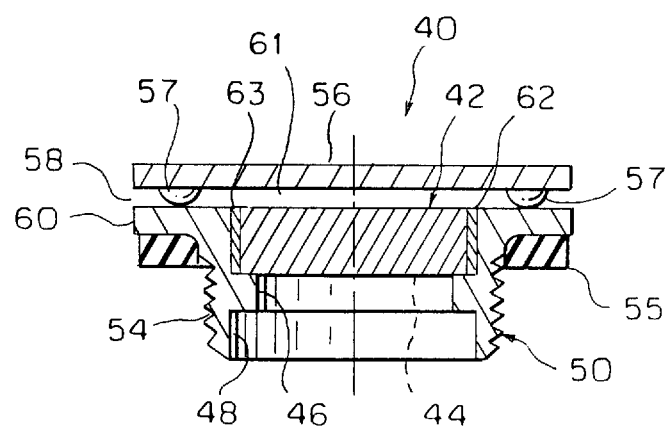
FIG. 5 is a side elevation of the drum vent filter of FIGS. 3 and 4.
Figure 6:
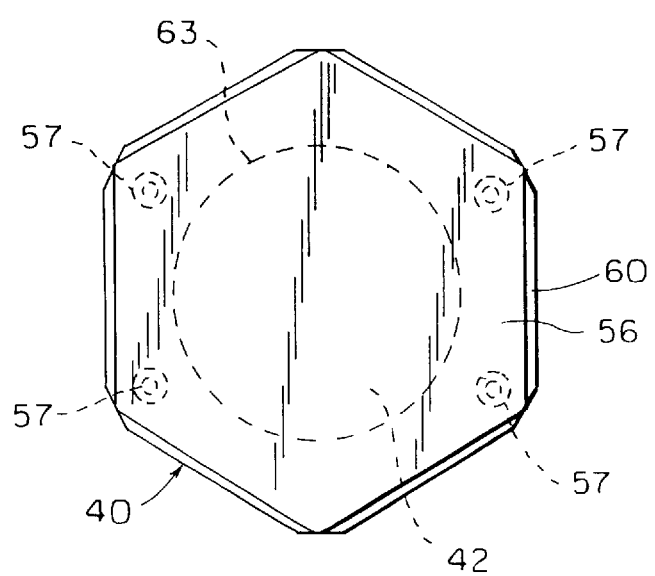
FIG. 6 is a top view of the drum vent filter of FIGS. 3–5.

Referring now to FIGS. 1 and 2, there is shown a prior art drum vent filter 10 which includes a housing 12 having a cylindrical portion 14 and a radially extending flange 16. The threaded cylindrical portion 14 is externally threaded for threading into a vent opening in a drum (not shown) containing a toxic waste material such as transuranic waste material. The housing 12 has a gasket 20 which seals against the lid (not shown) of the drum so that hydrogen gas within the drum can only vent through the housing. Within the housing 12 there is a filter element 21 made of a carbon-to-carbon composite filter media 22. The filter media 22 traps particulate matter while absorbing volatile organic compounds. The filter media has a diameter of about 0.73 inch, a thickness of about 0.6 inch, and a carbon density of about 0.15 g/cc. The diameter of the exposed portion of the inner face 23 of the filter media is about 0.375 inch because of coverage by annular flange 24 on housing 12. The filter media 22 is retained within the housing with a sealant 25.

Disposed above the radially extending flange 16 there is a lid 26 which is welded to the flange by four spaced feet 28 that are welded to the flange using a TIG welding technique. The lid 26 is hexagonal in shape and is separated from the top surface of the filter media 22 and the radial flange 16 by an axial gap 30 which is 0.075 inch in height with the spaced-apart feet 28 providing radial gaps 32. The gaps 30 and 32 provide openings through which hydrogen gas which has been diffused through the filter 22 enters the atmosphere.

Referring now to FIGS. 3–6 where there is shown an improved drum vent filter 40 which replaces the prior art vent filter 10. The vent filter 40 has several structural differences and dimensional differences which enhance its performance. A first difference is a change in the configuration and mounting of the filter element wherein a filter element 42 is utilized. The filter element 42 has a thickness range of about one quarter to about three tenths inch and a first face 44 which is substantially more open to the interior of the drum because it is not covered with an adhesive sealant material. Rather, the first face 44 rests against the top surface of a radially narrow lip 46 which projects approximately 1/10 inch from the cylindrical interior wall 48 of housing 50. The diameter of the filter element 42 is in the range of 0.60 inch to 1.0 inch and is preferably about 0.70 and in a specific embodiment, about 0.73 inch. The exposed first face 44 of the filter element 42 is about 0.45 inch to about 0.60 inch and preferably about 0.53 inch, which is substantially greater than the 0.375 diameter of the corresponding first face 23 of prior art filter element 22 shown in FIG. 1. By presenting a larger frontal area, the first face 44 is exposed to a larger amount of gas to be filtered, and by having a shorter diffusion path due to a smaller thickness of 1/4–3/10 inch, the filter element 42 is able to diffuse hydrogen gas faster. Due to the relatively small size of hydrogen gas molecules, increase in density from 0.15 grams/cm$^3$ to a range of 0.2 to 0.3 grams/cm$^3$ of the carbon-to-carbon filter media 40 does not slow down passage of hydrogen gas through the filter element 42 by a meaningful or substantial amount.

The length of the threaded cylindrical portion 54 of the vent filter 40 has been reduced by 0.5 inch as compared to the cylindrical portion 14 of the filtered vent 10 so that the damming effect of the threaded portion within the drum (not shown) is reduced substantially. Consequently, hydrogen gas around the periphery of the threaded portion is more readily able to flow into the space defined by the interior wall 48 and is therefore more likely to allow the diffusion of a greater amount of hydrogen gas through the filter element 42. An annular gasket 55 made of Neoprene® V is disposed around the threaded cylindrical portion 54 to seal with the top of the container (not shown) which contains the hazardous material.

The drum vent filter 40 has a lid 56 in the form of an impervious panel such as the lid 24 of the prior art embodiment; however, the lid 56 is separated by four spaces 57 from the top surface 58 of a radial flange 60 on the housing 50 by a gap 61 in the range of 0.125 to 0.175 inch (and preferably 0.15) rather than a gap of 0.075 inch. This substantial increase in space above the filter element 42 provided by the gap 61 provides for increased flow or diffusion through the filter element 42 while still protecting the filter element 42 from direct mechanical impact. The overall height of the filter element is about 0.75 inch compared to about 0.92 inch for the prior art vent filter 10.

The filter element 42 is sealed with the cavity 63 of the housing 50 only around its periphery with an RTV silicon sealant 62. The adhesive sealant is protected from direct contact with substances within the drum which might degrade the seal 62 because those substances would have to pass through the filter element 42 before contacting the seal.

This is because the lip 46 minimizes the possibility of direct contact with the seal by such substances which would have to flow radially through the carbon-to-carbon filter media 40 before contacting the seal 62. Since the filter media 40 of the filter element 42 adsorbs such materials, the chances of those materials becoming contacting and degrading the seal 62 is minimized.

The preferable material for the filter housing 50 and lid 56 is type 304 stainless steel, although other alloys may be used, for example, HASTELLOY® C-22® alloy available from Corrosion Materials, Inc. of Baker, La.

The drum vent filter 40 controls the release of volatile organic compounds (VOCs) while improving the ventilation of hydrogen gas in 55-gallon drums, overpack drums, and standard waste boxes containing transuranic, low-level, hazardous or mixed of waste. The drum vent filter 40 is adapted by its threaded exterior to be threaded into a standard 3/4 inch flange of a waste drum lid with about 10 foot-pounds of torque in order to compress the neoprene gasket 55 and accomplish a good seal.

The drum vent filter 40 has a resistance to flow of less than 1 inch water column DP at 210 ml per min. and a particle removal efficiency greater than 99.97% of 0.3 to 0.7 $\mu$ DOP aerosol. Hydrogen diffusivity is 24 E-06 Mol/sec/Mol fract with hydrogen resistance of 41,666 (category 20,30,40 wastes). It has been found that the hydrogen percentage as a function of time in a standardized test decreases from about an initial hydrogen concentration of 3.5% to a hydrogen concentration of about 2.5% in about 30 minutes, which is a substantial improvement over the prior art vent filter 10 of FIG. 1.

Without further elaboration, it is believed that one skilled in the art can, using the preceding description, utilize the present invention to its fullest extent. The above preferred specific embodiments are, therefore, to be construed as merely illustrative, and not limitative of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An improved drum vent filter for filtering hydrogen gas to remove particles therefrom the drum vent comprising:

an annular housing having an axially extending portion with a threaded exterior surface, and a cylindrical interior surface defining a cylindrical space with first and second axial openings, the cylindrical interior surface having an annular lip therein having an axially facing support surface and a free surface, the free surface being spaced at selected distance from the first axial opening and the support surface being spaced a selected distance from the second axial opening;

a radial flange extending outwardly from the axially extending portion of the housing has a top surface which is substantially flush with the second opening of the cylindrical interior surface and a bottom surface adjacent the threaded exterior surface of the cylindrical portion;

a cylindrical filter element comprised of a carbon-to-carbon filter media disposed within the cylindrical space, the filter element having a bottom surface abutting the annular lip and having a top surface; the filter element being retained within the cylindrical space with a peripheral layer of adhesive sealant;

a lid disposed in spaced relation to the top surface of the radial flange to define an axial gap between the top surface of the filter element and radial flange and a radial gap between the top surface of the radial flange and bottom surface of the lid, and an annular seal disposed about the cylindrical portion of the housing and abutting the bottom surface of the radial flange wherein the axial gap between the bottom surface of the lid has a height in the range of 0.125 inch to 0.175 inch; wherein cylindrical space has a diameter of at least 0.8 inch and wherein the housing space has an axial length no greater than 0.375 inch, whereby diffusion of hydrogen gas through the drum vent filter is enhanced.

2. The drum vent filter of claim 1 wherein the density of the filter media is in the range of 0.2 to 0.3 grams/cm$^3$ with the filter media having a thickness in the range of ¼ inch to ³⁄₁₀ inch and an exposed face width of at least 0.45 inch facing into the drum and at least 0.70 inch facing away from the drum.

3. The drum of claim 2 wherein the lip disposed within the cylindrical space has a width of ¹⁄₁₀ inch.

4. The drum vent filter of claim 3 wherein the axial gap is 0.15 inch.

5. The drum vent filter of claim 2, wherein the filter element has an exposed face width of at least 0.50 inch.

6. The drum vent filter of claim 5, wherein the filter element has an exposed face width of about 0.53 inch.

7. The drum vent filter of claim 1 wherein the axial gap is 0.150 inch.

8. The drum vent filter of claim 1, wherein the housing and lid are made of stainless steel.

9. The drum vent filter of claim 8, wherein the stainless steel is type 304 stainless steel.

10. The drum vent filter of claim 1, wherein the housing and lid are made of a steel alloy.

\* \* \* \* \*